(12) United States Patent
Zhang

(10) Patent No.: US 8,620,085 B2
(45) Date of Patent: Dec. 31, 2013

(54) IMAGE PROCESSING APPARATUS, IMAGE PROCESSING METHOD, AND IMAGE PROCESSING PROGRAM

(75) Inventor: Yitong Zhang, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 313 days.

(21) Appl. No.: 12/647,253

(22) Filed: Dec. 24, 2009

(65) Prior Publication Data

US 2010/0166319 A1 Jul. 1, 2010

(30) Foreign Application Priority Data

Dec. 26, 2008 (JP) ................................. 2008-332709

(51) Int. Cl.
*G06K 9/46* (2006.01)
(52) U.S. Cl.
USPC ........ 382/190; 382/201; 382/294; 348/208.4; 348/E05.031
(58) Field of Classification Search
USPC ........ 382/190, 201, 294; 348/208.4, E05.031
See application file for complete search history.

(56) References Cited

U.S. PATENT DOCUMENTS

| | | | |
|---|---|---|---|
| 6,473,536 B1 * | 10/2002 | Chiba et al. | 382/284 |
| 2007/0147706 A1 * | 6/2007 | Sasaki et al. | 382/295 |

FOREIGN PATENT DOCUMENTS

| | | |
|---|---|---|
| JP | 2004035702 A | 2/2004 |
| JP | 2004343483 A | 12/2004 |
| JP | 2005151495 A | 6/2005 |

OTHER PUBLICATIONS

Japanese Office Action for Application No. 2008-332709; May 15, 2012.
Chinese Office Action dated Mar. 18, 2013 issued in corresponding Chinese Application No. 200910249568.6.

* cited by examiner

*Primary Examiner* — Ruiping Li
(74) *Attorney, Agent, or Firm* — Sughrue Mion, PLLC

(57) ABSTRACT

The outlines of specific subjects becoming unnaturally deformed is prevented, while reducing the amount of calculations. A reference image setting section sets a reference image which is to become a reference from among a plurality of images. A specific subject detecting section detects a specific subject from within the reference image. A feature point extracting section extracts a plurality of feature points from within the reference image such that the average density of the feature points become higher in the vicinity of the outline of the specific subject. A corresponding point obtaining means corresponding point obtaining section obtains corresponding points within the other images that correspond to the extracted feature points. A coordinate converting section converts the coordinates of the positions of each pixel within the reference image and/or the other images such that the positions of the feature points and the positions of the corresponding points match.

6 Claims, 10 Drawing Sheets

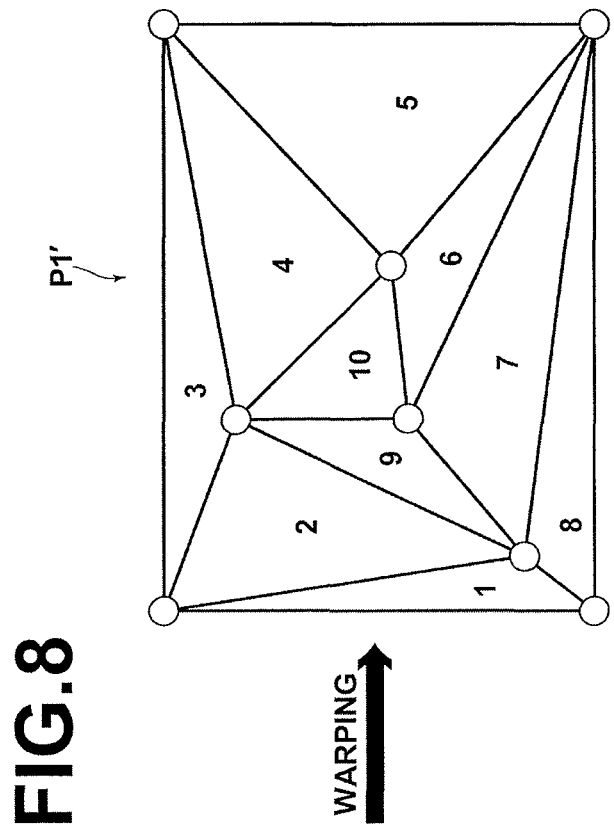
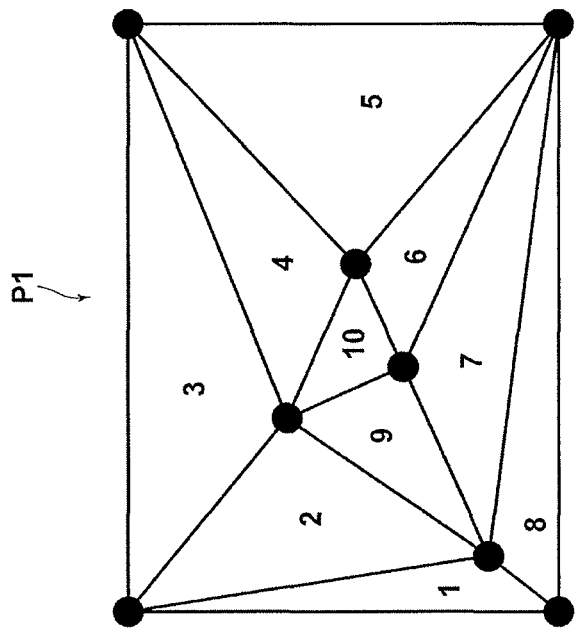
FIG. 8

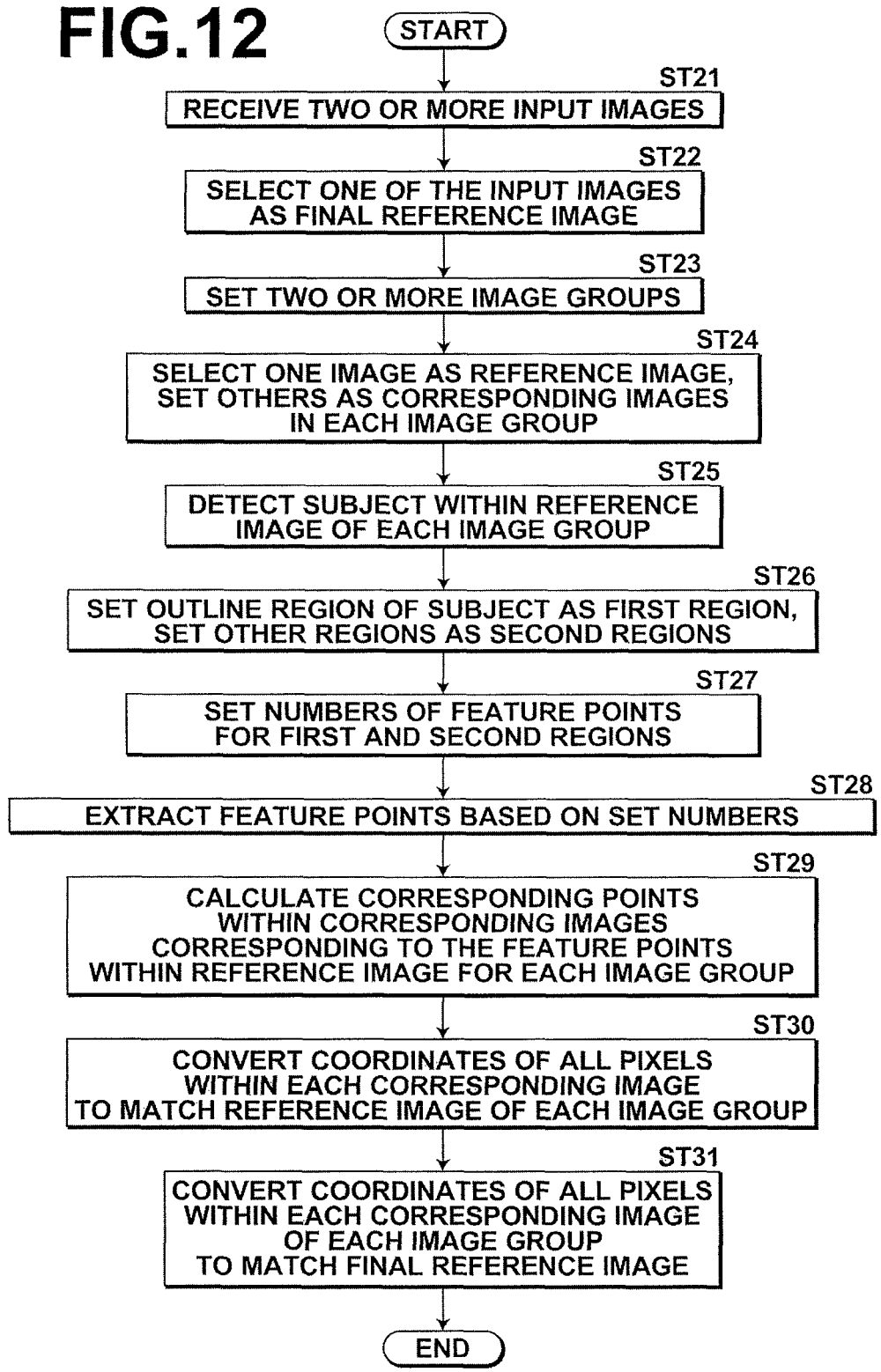

IMAGE PROCESSING APPARATUS, IMAGE PROCESSING METHOD, AND IMAGE PROCESSING PROGRAM

BACKGROUND OF THE INVENTION

1. Field of the Invention

The present invention is related to an image processing apparatus, an image processing method, and an image processing program suited to positioning and synthesizing a plurality of images which are obtained by imaging a subject.

2. Description of the Related Art

There are conventional techniques for reducing blur within images obtained by imaging devices, such as digital cameras, caused due to camera shake, movement of subjects, and the like. An example of such a technique is that in which a plurality of imaging operations are performed with short exposure times that will not cause image blur to occur, then a plurality of images obtained by the plurality of imaging operations are positioned and synthesized. Another example of such a technique is that in which a plurality of images having parallax corresponding to different viewpoints are obtained by a compound lens camera, then the plurality of images are positioned and synthesized.

Japanese Unexamined Patent Publication No. 2004-035702 discloses a method, in which a plurality of feature points are extracted from a first image, which is to become a reference from among a plurality of images. Next, corresponding points that correspond to each of the feature points extracted from within the first image are obtained within a second image. Then, the coordinates of the positions of each pixel of the second image are converted such that the corresponding points match the feature points that they correspond to. Finally, the first image and the coordinate converted second image are synthesized.

This coordinate conversion is performed by dividing the second image into a plurality of triangular patches having three corresponding points as vertices. Then, the triangular patches undergo affine transformation such that the corresponding points overlap the feature points within the first image that the corresponding points correspond to (refer to U.S. Pat. No. 6,473,536).

In the coordinate converting method described above, all of the pixels within the triangular patches undergo affine transform, based on the positional relationships among the corresponding points that form the vertices of the triangular patches and the feature points that the corresponding points correspond to. For this reason, local deformations within images at the interiors of the triangular patches are not properly reflected, and there are cases in which images after coordinate conversion become unnaturally deformed. For example, in the case that two images, which are obtained by sequential photography of a car that moves against a still background, are positioned and synthesized, errors in correspondence become great at the borderline between the car region, at which large changes occur, and the still background region. Accordingly, there is a high probability that the outline of the car will become unnaturally deformed.

It is possible to reduce the amount of correspondence error between images by increasing the number of feature points which are extracted, that is, by decreasing the sizes of the triangular patches that the second image is divided into. However, there is a problem that such a solution greatly increases the amount of calculations necessary for positioning.

SUMMARY OF THE INVENTION

The present invention has been developed in view of the foregoing circumstances. It is an object of the present invention to provide an image processing apparatus, an image processing program, and an image processing method which are capable of preventing the outlines of specific subjects from becoming unnaturally deformed, while reducing the amount of necessary calculations.

A first image processing apparatus of the present invention is characterized by comprising:

reference image setting means, for setting a reference image to become a reference from among a plurality of images;

detecting means, for detecting a specific subject from within the reference image set by the reference image setting means;

feature point extracting means, for extracting a plurality of feature points from within the reference image such that the average density of the feature points become higher in the vicinity of the outline of the specific subject detected by the detecting means;

corresponding point obtaining means, for obtaining corresponding points within the plurality of images other than the reference image that correspond to the feature points extracted by the feature point extracting means; and coordinate converting means, for converting the coordinates of the positions of each pixel within the reference image and/or the other images such that the positions of the feature points and the positions of the corresponding points that correspond to the feature points match.

The first image processing apparatus of the present invention may be of a configuration, in which:

the plurality of images includes at least three images; and the coordinate converting means converts the coordinates of the positions of each pixel within the other images such that the positions of the corresponding points obtained by the corresponding point obtaining means match the positions of the feature points.

A second image processing apparatus of the present invention is characterized by comprising:

image group setting means, for setting at least two image groups such that each of at least three images is included into at least one of the image groups;

reference image setting means, for setting a final reference image, which is to become a final reference for the at least three images, and for setting reference images, which are to become references in each of the image groups set by the image group setting means;

detecting means, for detecting a specific subject from within the reference images of each of the image groups, set by the reference image setting means;

feature point extracting means, for extracting a plurality of feature points from within the reference images such that the average density of the feature points become higher in the vicinity of the outline of the specific subject detected by the detecting means;

corresponding point obtaining means, for obtaining corresponding points that correspond to the feature points extracted by the feature point extracting means, within images included in each of the image groups other than the reference images;

converting function obtaining means, for obtaining coordinate converting functions for positioning the reference images with respect to the final reference image; and coordinate converting means, for converting the coordinates of the positions of each pixel within the other images such that the positions of the corresponding points that correspond to the feature points match the positions of the feature points, and then converting the coordinates of the positions of each pixel of the coordinate converted images employing the coordinate converting functions obtained by the converting function obtaining means.

The second image processing apparatus of the present invention may be of a configuration, in which:

the at least three images are obtained sequentially; and the setting of the image groups is performed to set the at least two image groups such that at least two images which are obtained in sequence are included in each of the image groups.

The first and second image processing apparatuses of the present invention may be of a configuration, in which the specific subject is a face or a moving object. However, the specific subject is not limited to faces and moving objects. The specific subject may be any subject, such as a lattice pattern, in which slight shifting in the deformation of the outline thereof will be judged as faulty positioning.

The first and second image processing apparatuses of the present invention may be of a configuration, in which:

the specific subject is a face;

the detecting means functions to discriminate whether images within a detection frame is an image that represents the specific subject, and performs detection by scanning the detection frame within the reference image; and the vicinity of the outline is a region inside the detection frame having a predetermined width and/or a region outside the detection frame having a predetermined width.

In addition, in the first and second image processing apparatuses of the present invention, the vicinity of the outline is a region inside the outline of the specific subject having a predetermined width and/or a region outside the outline of the specific subject having a predetermined width.

A first image processing method of the present invention is characterized by comprising the steps of:

setting a reference image to become a reference from among a plurality of images;

detecting a specific subject from within the set reference image;

extracting a plurality of feature points from within the reference image such that the average density of the feature points become higher in the vicinity of the outline of the detected specific subject;

obtaining corresponding points within the plurality of images other than the reference image that correspond to the extracted feature points; and coordinate converting means, for converting the coordinates of the positions of each pixel within the reference image and/or the other images such that the positions of the feature points and the positions of the corresponding points that correspond to the feature points match.

A second image processing method of the present invention is characterized by comprising the steps of:

setting at least two image groups such that each of at least three images is included into at least one of the image groups;

setting a final reference image, which is to become a final reference for the at least three images, and for setting reference images, which are to become references in each of the set image groups;

detecting a specific subject from within the reference images set within each of the image groups;

extracting a plurality of feature points from within the reference images such that the average density of the feature points become higher in the vicinity of the outline of the detected specific subject;

obtaining corresponding points that correspond to the extracted feature points, within images included in each of the image groups other than the reference images;

obtaining coordinate converting functions for positioning the reference images with respect to the final reference image; and converting the coordinates of the positions of each pixel within the other images such that the positions of the corresponding points that correspond to the feature points match the positions of the feature points, and then converting the coordinates of the positions of each pixel of the coordinate converted images employing the obtained coordinate converting function.

Note that in the first and second image processing methods of the present invention, the steps do not necessarily have to be performed in the order described above. For example, the step of setting the final reference image may be performed at any time prior to obtaining the coordinate converting functions for positioning the reference images to the final reference image. The final reference image setting step may be performed as a desired timing, such as following the image group setting step, and the reference image setting step. Likewise, the step of obtaining the coordinate converting functions may be performed at any time after the reference images and the final reference image are set, and before the coordinate conversion employing the coordinate conversion function is employed.

The first and second image processing programs of the present invention cause a computer to execute the first and second image processing methods of the present invention, respectively.

In the second image processing apparatus, the second image processing method, and the second image processing program, the expression "positioning the reference images with respect to the final reference image" refers to converting the coordinates of the positions of each pixel within the reference images such that the positions of points that correspond among the reference images and the final reference image match.

Note that the programs of the present invention may be provided being recorded on computer readable media. Those who are skilled in the art would know that computer readable media are not limited to any specific type of device, and includes, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

The first image processing apparatus, the first image processing method, and the first image processing program of the present invention set a reference image, which will become a reference, from among a plurality of images, and a specific subject is detected within the set reference image. A plurality of feature points are extracted from within the reference image such that the average density of the feature points become higher in the vicinity of the outline of the detected specific subject. Then, corresponding points that correspond to the extracted feature points are obtained within images from among the plurality of images other than the reference image. Finally, the coordinates of the positions of each pixel within the reference image and/or the other images are converted such that the positions of the feature points and the positions of the corresponding points that correspond to the feature points match. Therefore, the positioning accuracy of the outline of the specific subject, which is likely to become unnaturally deformed, can be improved over that of the other regions, and unnatural deformation of the outline of the specific subject can be prevented, while reducing the amount of necessary calculations.

The second image processing apparatus, the second image processing method, and the second image processing program of the present invention set at least two image groups such that each of at least three images is included into at least one of the image groups. A final reference image, which is to become a final reference for the at least three images is set, and reference images, which are to become references in each of the image groups are also set. A specific subject is detected from within the reference images of each of the image groups, then a plurality of feature points are extracted from within the reference images such that the average density of the feature points become higher in the vicinity of the outline of the specific subject detected by the detecting means. Next, corresponding points that correspond to the feature points extracted by the feature point extracting means are obtained, within images included in each of the image groups other than the reference images. Then, coordinate converting functions for positioning the reference images with respect to the final reference image is obtained. Finally, the coordinates of the positions of each pixel within the other images are converted such that the positions of the corresponding points that correspond to the feature points match the positions of the feature points, and then the coordinates of the positions of each pixel of the coordinate converted images are converted employing the coordinate converting functions obtained by the converting function obtaining means. Therefore, the positioning accuracy of the outline of the specific subject, which is likely to become unnaturally deformed, can be improved over that of the other regions, and unnatural deformation of the outline of the specific subject can be prevented, while reducing the amount of necessary calculations.

A configuration may be adopted, wherein the at least three images are images which are obtained sequentially; and the setting of the image groups is performed to set the at least two image groups such that at least two images which are obtained in sequence are included in each of the image groups. In this case, because images which are obtained in sequence tend to be more similar than images which are obtained out of sequence, positioning at higher accuracy is facilitated. In addition, processes can be initiated without waiting for all of the images to be obtained, thereby expediting the process as a whole.

In the case that the specific subject is a face, slight shifts in the deformation of the outlines of human faces are readily noticeable, and tend to be judged as faulty positioning. Therefore, by improving the positioning accuracy with respect to the outlines of faces compared to that of other regions, faulty positioning can be reduced.

In the case that the specific subject is a moving object as well, slight shifts in the deformation of the outlines thereof are readily noticeable, and tend to be judged as faulty positioning. Therefore, by improving the positioning accuracy with respect to the outlines of faces compared to that of other regions, faulty positioning can be reduced.

BRIEF DESCRIPTION OF THE DRAWINGS

FIG. 8 is a diagram for explaining a warping process, performed by a coordinate converting section.

FIG. 12 is a flow chart that illustrates the processes performed by the image processing apparatus of the second embodiment.

DESCRIPTION OF THE PREFERRED EMBODIMENTS

Hereinafter, preferred embodiments of the image processing apparatus of the present invention will be described with reference to the attached drawings. Note that an image processing apparatus 1 according to a first embodiment of the present invention is realized by executing an image processing program on a computer or an imaging device (for example, a digital camera which is capable of performing continuous photography or a compound lens camera). At this time, the image processing program is distributed by being recorded on data recording media such as CD-ROM's, or distributed via networks such as the Internet, and installed in the computer or the imaging device.

Figure 1:
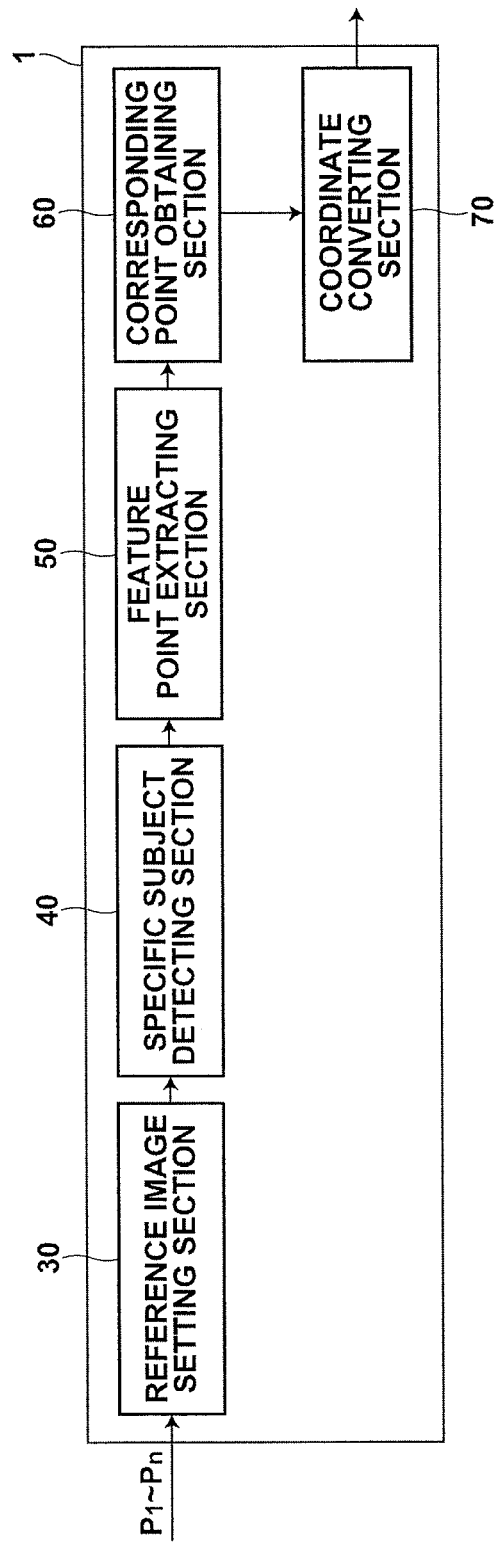
FIG. 1 is a block diagram that illustrates the schematic construction of an image processing apparatus according to a first embodiment of the present invention.

As illustrated in FIG. 1, the image processing apparatus 1 is equipped with: a reference image setting section 30; a specific subject detecting section 40; a feature point extracting section 50; a corresponding point obtaining section 60; and a coordinate converting section 70.

Figure 2:
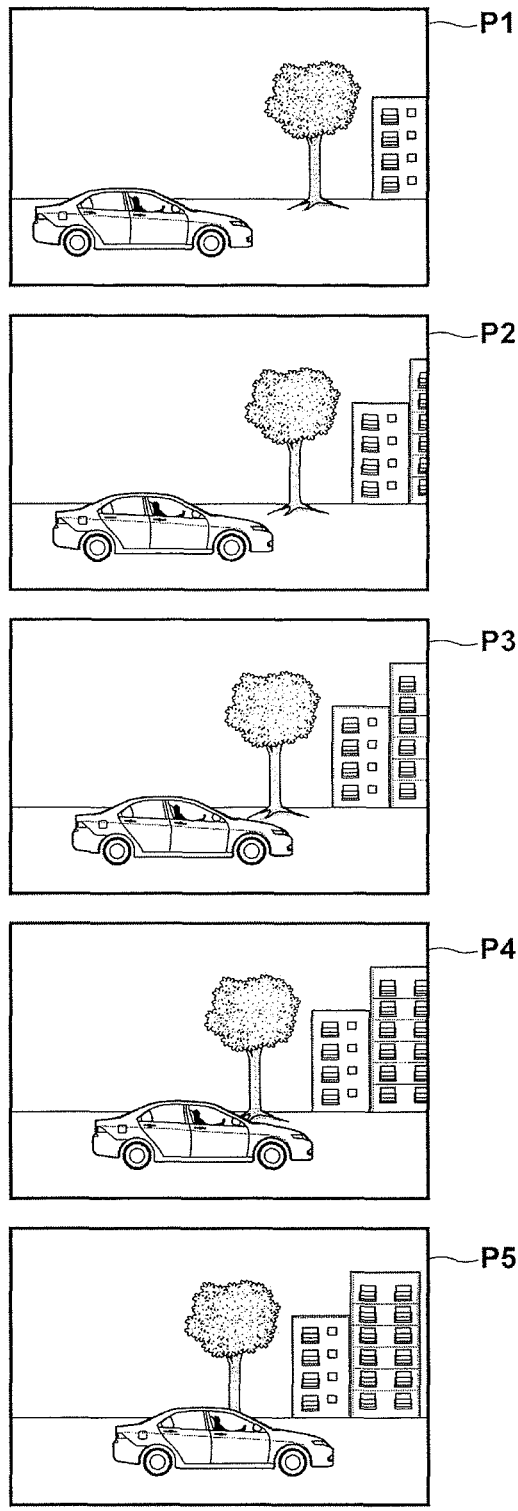
FIG. 2 is a diagram for explaining a setting process for a reference image, performed by a reference image setting section.

The reference image setting section 30 sets an image from among a plurality of images P1 through Pn as a reference image Ps, when the plurality of images P1 through Pn are input. Note that the reference image Ps is an image which will become a reference when deforming the other images during a coordinate converting process to be described later. That is, the other images will be deformed to overlap with the reference image Ps. Therefore, it is preferable for an image having a small amount of shift from the other images as a whole to be set as the reference image Ps. For example, in the case that a plurality of images P1 through P5, which are obtained by continuous photography, are input as illustrated in FIG. 2, the middle image P3 may be set as the reference image Ps. Alternatively, in the case that a plurality of images P1 through Pn are those obtained by simultaneous photography from different viewpoints by a compound lens camera, an image obtained from the approximate central viewpoint may be set as the reference image Ps.

The specific subject detecting section 40 detects a region in which a specific subject is pictured within the reference image Ps set by the reference image setting section 30. Here, the specific subject is a target of detection of a specific subject detecting program built in to the specific subject detecting section 40. Examples of such specific subjects include: moving objects; human faces; and lattice patterns. Here, the term "moving objects" refers to subjects which are moving during photography of the images. Hereinafter, specific examples of detecting methods will be described.

In the case that the specific subject is a face, a classifier that judges whether an image within a detection frame is an image of a human face, by employing an algorithm such as Ada-Boost to perform machine learning of a plurality of sample images which are known to be images of human faces, and a plurality of sample images which are known not to be images of human faces. The detection frame of the classifier is scanned over an image in which detection is to be performed, and whether images within the detection frame at each position that the detection frame is scanned over is a human face is judged, to detect a region in which a human face is pictured.

Figure 3:
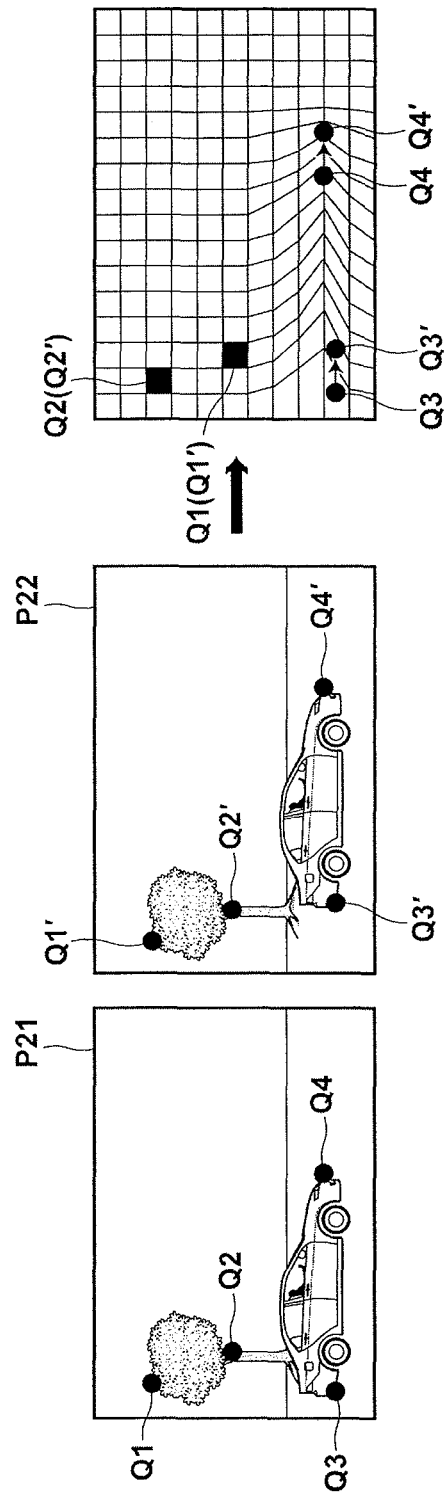
FIG. 3 is a diagram for explaining a detecting process for detecting a moving object, performed by a specific subject detecting section.
Figure 4:
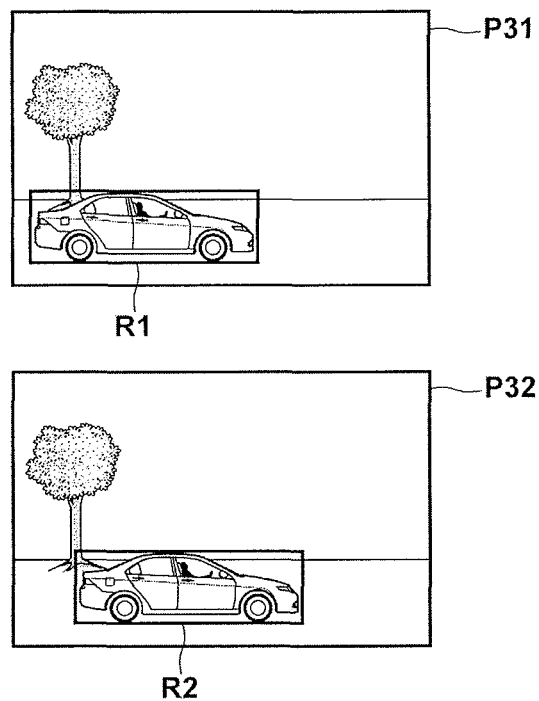
FIG. 4 is a diagram for explaining another detecting process for detecting a moving object, performed by a specific subject detecting section.

In the case that the specific subject is a moving object, changes in the coordinates of corresponding pixels between input images, such as images P21 and P22 illustrated in FIG. 3, are obtained as movement vectors. A region constituted by pixels having movement vectors that exceed a predetermined threshold value is detected as a moving object region. In the example of FIG. 3, the region of a car, constituted by pixels Q3, Q4 and the like having large degrees of movement, is detected as the moving object region. Note that in the case that the specific subject is a moving object, a specific object (for example, a car) may be detected within input images, such as images P31 and P32 illustrated in FIG. 4. In the case that the position of the specific object (the car) differs between the input images, the region may be detected as a moving object region.

In the case that the specific subject is a lattice pattern, Hough transform is administered on an image in which detection is to be performed. A region, at which regular and perpendicular line segments are concentrated, is detected as a region in which a lattice pattern is pictured.

The feature point extracting section 50 extracts a plurality of feature points from within the reference image Ps such that the average density of the feature points is greater at a region Ra (first region) in the vicinity of the outline of the specific subject detected by specific subject detecting section 40 than in other regions Rb (second regions).

Figure 5:
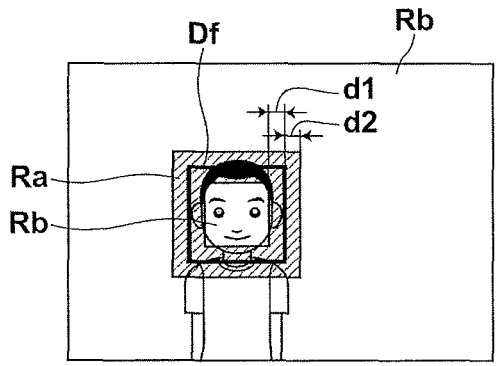
FIG. 5 is a diagram that illustrates an example of a region in the vicinity of an outline, in the case that a specific subject is a human face.
Figure 6:
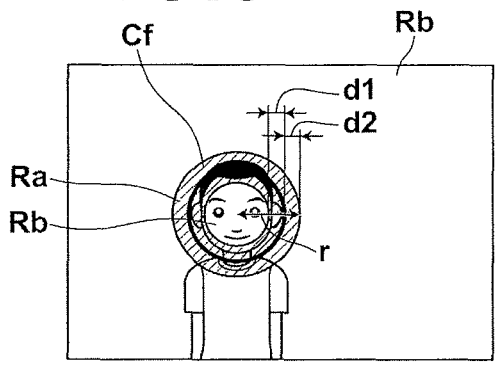
FIG. 6 is a diagram that illustrates another example of a region in the vicinity of an outline, in the case that the specific subject is a human face.

Here, in the case that the specific subject is a human face, and the specific subject detecting section 40 functions to judge whether images within a detection frame Df are images that represent faces, and detects human faces by scanning the detection frame Df over the reference image Ps, the region Ra (first region) in the vicinity of the outline may be a region (indicated by hatching in FIG. 5) having a constant width d1 toward the interior and a constant width d2 toward the exterior of the detection frame Df. Alternatively, the region Ra (first region) in the vicinity of the outline may be a region (indicated by hatching in FIG. 6) having a constant width d1 toward the interior and a constant width d2 toward the exterior of a circular frame Cf having the center C of the detection frame Df as its center and a radius of r. In the case that the specific subject detecting section 40 detects face regions by judging whether each pixel within the reference image Ps is a pixel that represents a skin colored region, based on skin color data unique to humans, the region Ra (first region) in the vicinity of the outline may be a region having a constant width toward the interior and a constant width toward the exterior of an outline of the detected face region.

Figure 7:
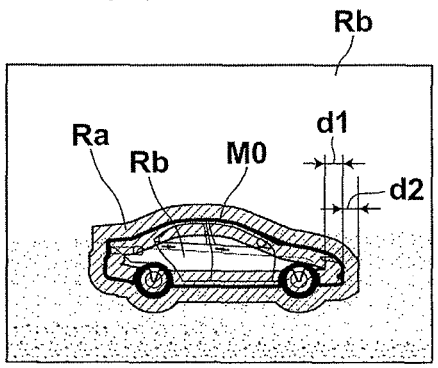
FIG. 7 is a diagram that illustrates an example of a region in the vicinity of an outline, in the case that the specific subject is a moving object.

In the case that the specific subject is a moving object, and the specific subject detecting section 40 detects moving object regions, the region Ra (first region) in the vicinity of the outline may be a region (indicated by hatching in FIG. 7) having a constant width d1 toward the interior and a constant width d2 toward the exterior of the outline MO of the detected moving object.

Meanwhile, the other regions Rb (second regions) are regions within the image other than the region Ra (first region) in the vicinity of the outline.

The feature point extracting section 50 first determines the average density of the feature points for each of the regions Ra and Rb. It is assumed that an average density d2 within the regions Rb is set in advance to d2=1%, for example. An average density d1 within the region Ra is calculated based on the average density d2. Specifically, the average density d2 is multiplied by a constant K (K>1) which is set in advance to calculate the average density d1. Alternatively, the average density d2 may be multiplied by a function F(s) related to the area s of the region Ra, to calculate the average density d1. Note that it is preferable for lower limits to be set for the average densities d1 and d2 such that the values thereof do not become excessively small.

It is desirable for the average density d1 of feature points within the region Ra in the vicinity of the outline to be 1.5 or more times, and preferably 2 or more times the average density d2 of feature points within the other regions Rb. An effect that unnatural deformation of the outline of a specific subject can be prevented is generally obtained when the average density d1 of feature points within the region Ra in the vicinity of the outline is 1.5 or more times the average density d2 of feature points within the other regions Rb. A greater effect can be observed when the average density d1 is 2 or more times the average density d2. However, there are differences in each image regarding what multiple of the average density d2 actually yields the effect.

Next, the number of feature points to be extracted from within the region Ra and the number of feature points to be extracted from within the regions Rb are set, based on the areas of the regions Ra and Rb, as well as the average densities d1 and d2 determined as described above. Specifically, a value obtained by multiplying the area of the region Ra by the average density d1 is set as the number of feature points to be extracted from the region Ra, and a value obtained by multiplying the area of the regions Rb by the average density d2 is set as the number of feature points to be extracted from the regions Rb.

Next, the set numbers of feature points are extracted from the regions Ra and Rb. The feature points are points that exhibit characteristics as the corners of the subject, image patterns, or the like, and are extracted based on gradient data of pixel signals. For example, two unique values $\lambda 1$ and $\lambda 2$ are derived from the pixel values of four neighboring pixels Ps (i, j), Ps (i+1, j), Ps (i, j+1), and Ps (i+1, j+1) for each pixel Ps (i, j) within the reference image Ps. Minimum values min ($\lambda 1$, $\lambda 2$) from among the values $\lambda 1$ and $\lambda 2$ are calculated as the characteristic value of the pixels Ps (i, j). The pixels within the regions Ra and Rb are sorted by the sizes of their characteristic values, and the set numbers of pixels are extracted from the uppermost sorted pixels, to positively obtain the predetermined numbers of feature points. Note that the predetermined numbers of feature points may alternatively be extracted using the Moravec method, the Harris method, or the like. In the present invention, the extraction method for extracting the feature points is not particularly limited.

The corresponding point obtaining section 60 detects corresponding points within the plurality of images P1 through Ps−1 and Ps+1 through Pn, which are the images P1 through Pn other than the reference image Ps, that correspond to the feature points extracted by the feature point extracting section 50. The corresponding points are points having characteristics that match those of the feature points. The KLT method, the block matching method or the like may be utilized to detect the corresponding points. In the present invention, the detecting method for detecting the corresponding points is not particularly limited.

The coordinate converting section 70 deforms the other images P1 through Ps−1 and Ps+1 through Pn such that they overlap the reference image Ps. The coordinates of the positions of each pixel within the other images are converted such that the positions of the corresponding points obtained by the corresponding point obtaining section 60 match the positions of the feature points that they correspond to. The coordinate conversion may be performed by the warping process, in which images are locally warped. In the warping method, generally, images are divided into triangular patches, and each of the triangular patches is deformed.

Specifically, an image P1, which is to undergo coordinate conversion, is divided into a plurality of adjacent triangular patches having the corresponding points and the corners of the image P1 as vertices, as illustrated in the left side of FIG. 8. Then, each of the triangular patches within the image P1 undergoes affine transform such that the corresponding points of the image P1 overlap the feature points that they correspond to, to generate an image P1'. The formulas to be utilized in the affine transform process are shown below as Formula (1).

$$x' = ax + by + s$$
$$y' = cx + dy + t \quad (1)$$

in Formula (1), (x, y) represent the coordinate values of a point within a given triangular patch within the image P1, and (x', y') represent the coordinate values of a point corresponding to the point (x, y). a, b, c, d, s, and t are unknown parameters, which can be uniquely determined from the coordinate values of the three vertices of the triangular patch. That is, the parameters for the affine transform process are calculated from combinations of the three vertices of triangular patches and the feature points corresponding to these points. Each of the points, that is, each of the pixels, within the triangular patches undergo affine transform based on the calculated parameters. The warping process is completed when all of the triangular patches undergo affine transform.

Figure 9:
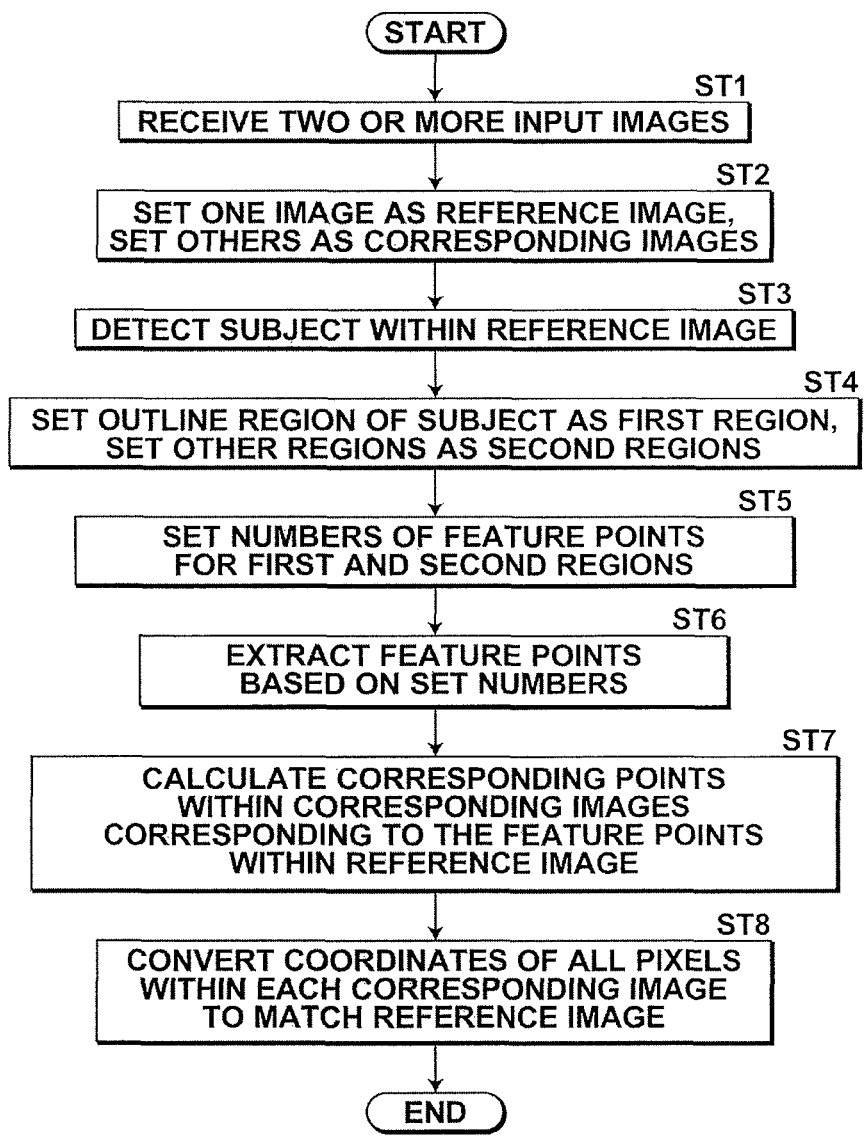
FIG. 9 is a flow chart that illustrates the processes performed by the image processing apparatus of the first embodiment.

Next, an example of the processes performed by the image processing apparatus 1 of the first embodiment will be described with reference to the flow chart of FIG. 9.

First, a plurality of images P1 through Pn are input (step ST1). The reference image setting section 30 sets one of the images from among the plurality of images P1 through Pn as a reference image Ps, and sets images other than the reference image Ps as corresponding images (step ST2). Next, the specific subject detecting section 40 detects a specific subject from the reference image Ps (step ST3). Then, the feature point extracting section 50 designates the region in the vicinity of the outline of the specific subject detected in step ST3 as a first region, designates regions other than the fist region as second regions (step ST4), sets the number of feature points to be extracted from each of the first and second regions such that the average density of feature points is greater in the first region than in the second region (step ST5), and extracts the set numbers of feature points from each of the first and second regions (step ST6). Next, the corresponding point obtaining section 60 obtains corresponding points within the corresponding images that correspond to the feature points extracted by the feature point extracting section 50 (step ST7). Thereafter, the coordinate converting section 70 converts the coordinates of the positions of each pixel within the corresponding images such that the positions of the corresponding points obtained therein match the positions of the feature points that the corresponding points correspond to (step ST8). The coordinate converted corresponding images and the reference images are synthesized, by adding the pixel values of corresponding pixels therein, or by calculating the averages of the pixel values of corresponding pixels therein.

Next, an image processing apparatus 2 according to a second embodiment of the present invention will be described with reference to FIG. 10 through FIG. 12. Note that elements of the image processing apparatus illustrated in FIG. 10 which are the same as those of the image processing apparatus 1 are denoted by the same reference numerals, and detailed descriptions thereof will be omitted.

Figure 10:
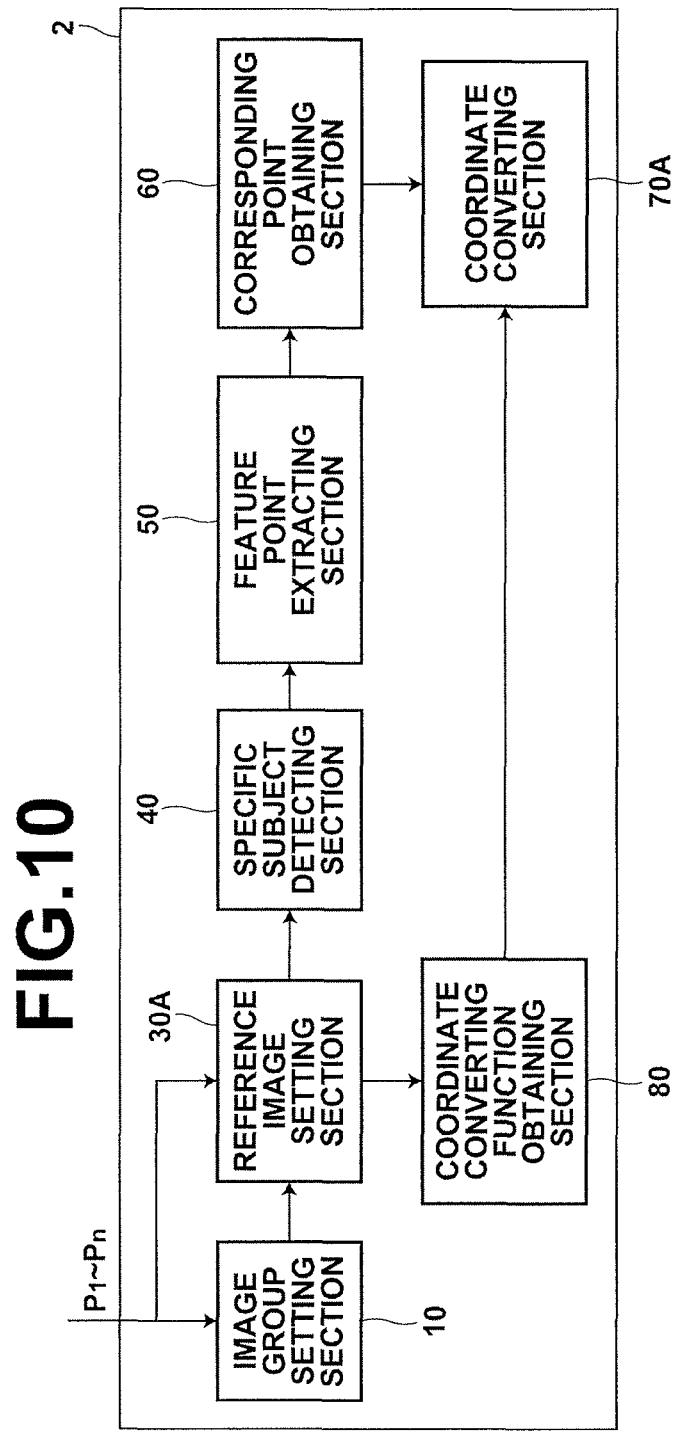
FIG. 10 is a block diagram that illustrates the schematic construction of an image processing apparatus according to a second embodiment of the present invention.

As illustrated in FIG. 10, the image processing apparatus 2 is equipped with: an image group setting section 10; a reference image setting section 30A; a specific subject detecting section 40; a feature point extracting section 50; a corresponding point obtaining section 60; a coordinate converting section 70A; and a coordinate converting function obtaining section 80.

The image group setting section 10 sets at least two image groups such that each Image from within a plurality of images P1 through Pn is included in at least one image group, when the plurality of images P1 through Pn are input. In the case that the plurality of images P1 through Pn are those which have been obtained sequentially, such as by continuous photography, it is preferable for the image groups to be set such that at least two images which are obtained in sequence are included in each of the image groups. For example, in the case that a plurality of images P1 through P5, which have been obtained sequentially, are input as illustrated in FIG. 11, images P1 and P2, the image groups may be set such that images P2 and P3, images P3 and P4, and images P4 and P5 belong to single image groups, respectively.

The reference image setting section 30A sets one image from among the plurality of images P1 through Pn to be a final reference image Pf when the plurality of images P1 through Pn are input. In addition, the reference image setting section 30A sets one image within each of the image groups set by the image group setting section 10 to be a reference image Ps.

The final reference image Pf is an image which will become a final reference when deforming the other images during a coordinate converting process to be administered by the coordinate converting section 70A. That is, the other images will be deformed to overlap with the final reference image Pf. Therefore, it is preferable for an image having a small amount of shift from the other images as a whole to be set as the final reference image Pf. Meanwhile, the reference images Ps are images that serve as primary references when deforming the other images within the image group to which the reference images Ps belong. The other images, which are deformed using the reference images Ps as a reference will be ultimately deformed with the final reference image Pf as a final reference. Therefore, it is preferable for the images closest to the final reference image from among the plurality of images that constitute each image group to be set as the reference images Ps. For example, in the case that a plurality of images P1 through P5, which are obtained by continuous photography, are input, the middle image P3 may be set as the final reference image Pf. In addition, in the case that four image groups are set for the images P1 through P5 as illustrated in FIG. 11, image P2 may be set as the reference image Ps for image group 1, image P3 may be set as the reference image Ps for image group 2, image P3 may be set as the reference image Ps for image group 3, and image P4 may be set as the reference image Ps for image group 4.

The specific subject detecting section 40 detects a region in which a specific subject is pictured within the reference image Ps set by the reference image setting section 30A for each image group set by the image group setting section 10.

The feature point extracting section 50 extracts a plurality of feature points from within the reference image Ps of each of the image groups set by the image group setting section 10 such that the average density of the feature points is greater at a region Ra (first region) in the vicinity of the outline of the specific subject detected by specific subject detecting section 40 than in other regions Rb (second regions).

The corresponding point obtaining section 60 detects corresponding points within the plurality of images within each of the image groups set by the image group setting section 10 other than the reference images Ps that correspond to the feature points within the reference images Ps.

The coordinate converting section 70A deforms the other images within each of the image groups set by the image group setting section 10 such that they overlap the reference images Ps. The coordinates of the positions of each pixel within the other images are converted such that the positions of the corresponding points match the positions of the feature points that they correspond to.

In addition, the coordinate converting section 70A performs converts the coordinates of the positions of each pixel of the coordinate converted images obtained by the above coordinate conversions, employing coordinate converting functions obtained by the coordinate converting function obtaining section 80 in a manner to be described later. Note that this coordinate conversion process is omitted in cases that the reference images Ps and the final reference image Pf are the same image.

Note that here, images, which are the objects of coordinate conversion, first undergo coordinate conversion using the reference images Ps as references. Then, further coordinate conversion is performed employing the coordinate converting functions of the reference images Ps and the final reference image. However, the final coordinate converted images may be obtained in a single coordinate conversion process, by deriving coordinate converting functions for the images, which are the objects of coordinate conversion, based on the conversion relationships between the images and the final reference image Pf.

The coordinate converting function obtaining section 80 obtains a coordinate converting function for positioning the reference image Ps, set within each of the image groups set by the image group setting section 10, with respect to the final reference image Pf. Note that the coordinate converting functions may be obtained by extracting feature points from the final reference image Pf, obtaining corresponding points corresponding thereto within the reference images Ps, and deriving converting functions for converting the coordinates of the positions of each pixel within the reference images Ps such that the corresponding points match the feature points. Alternatively, in the case that a combination of another image and a reference image Ps that matches the combination of the reference image Ps and the final reference image Pf during coordinate conversion of the other images within an image group to the reference image Ps, the converting function which is utilized during this coordinate conversion process may be obtained as the coordinate converting function for positioning the reference image Ps with respect to the final reference image Pf.

Figure 11:
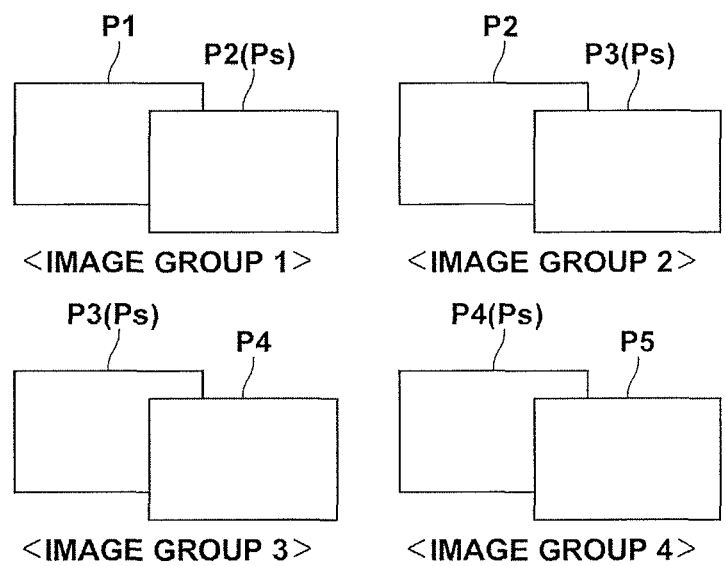
FIG. 11 is a diagram that illustrates examples of image groups which are set by an image group setting section.

For example, in the case that four image groups are set for images P1 through P5 as illustrated in FIG. 11, the coordinate converting section 70A performs a coordinate conversion process to deform image P1 to overlap reference image P2 within image group 1, and a coordinate conversion process to deform image P2 to overlap reference image P3 within image group 2. When the coordinate converted image obtained by performing the coordinate conversion process in image group 1, that is, reference image P2, is to be positioned with respect to final reference image P3, the converting function which was utilized to perform coordinate conversion in image group 2 may be obtained as is, and utilized.

Next, an example of the processes performed by the image processing apparatus 2 of the second embodiment will be described with reference to the flow chart of FIG. 12.

First, a plurality of images P1 through Pn are input (step ST21). The reference image setting section 30A sets one of the images from among the plurality of images P1 through Pn as a final reference image Pf (step ST22). The image group setting section 10 sets at least two image groups such that each of the images P1 through Pn is included in at least one of the image groups (step ST23). Next, the reference image setting section 30A sets one of the images from among the plurality of images within each of the image groups set in step ST23 as a reference image Ps, and sets images other than the reference image Ps as corresponding images (step ST24). Next, the specific subject detecting section 40 detects a specific subject from each of the reference images Ps (step ST25). Note that in step ST26 and the following steps, processes are administered with respect to each of the image groups set in step ST23, as is the case for steps ST24 and ST25. Then, the feature point extracting section 50 designates the region in the vicinity of the outline of the specific subject detected in step ST25 as a first region, designates regions other than the fist region as second regions (step ST26), sets the number of feature points to be extracted from each of the first and second regions such that the average density of feature points is greater in the first region than in the second region (step ST27), and extracts the set numbers of feature points from each of the first and second regions (step ST28). Next, the corresponding point obtaining section 60 obtains corresponding points within the corresponding images that correspond to the feature points extracted by the feature point extracting section 50 (step ST29). Thereafter, the coordinate converting section 70A converts the coordinates of the positions of each pixel within the corresponding images such that the positions of the corresponding points obtained therein match the positions of the feature points within the reference image Ps that the corresponding points correspond to (step ST30). Then, the coordinate converting section 70A administers coordinate conversion on each of the coordinate converted images obtained in step ST30 to position them with respect to the final reference image Pf (step ST31). The plurality of images P1 through Pn are synthesized, by adding the pixel values of corresponding pixels therein, or by calculating the averages of the pixel values of corresponding pixels therein.

According to the embodiments described above, a specific subject, which is likely to become unnaturally deformed when positioning and synthesizing a plurality of images obtained by photography of the subject, is detected. The average density of feature points to be employed for positioning calculations is set higher at the region Ra in the vicinity of the outline of the subject than that at the other regions Rb.

Therefore, the positioning accuracy can be improved for the outline compared to that for the other regions, and unnatural deformation of the outline of the specific subject can be prevented, while reducing the amount of necessary calculations.

What is claimed is:

1. An image processing apparatus, comprising:
   a reference image setting unit configured to set a reference image to become a reference from among a plurality of images;
   a detecting unit configured to detect a specific subject from within the reference image set by the reference image setting unit;
   a feature point extracting unit configured to extract a plurality of feature points from within the reference image such that the average density of number of the feature points become higher in the vicinity of the outline of the specific subject detected by the detecting unit than the average density of number of feature points at other regions;
   a corresponding point obtaining unit configured to obtain corresponding points within the plurality of images other than the reference image that correspond to the feature points extracted by the feature point extracting unit; and
   a coordinate converting unit configured to convert the coordinates of the positions of each pixel within at least one of the reference image and the other images such that the positions of the feature points and the positions of the corresponding points that correspond to the feature points match, and
   wherein:
   the specific subject is a face;
   at least one of the above units are implemented by a processor;
   the detecting unit functions to discriminate whether an image representing the specific subject is within a detection frame and performs detection by scanning the detection frame within the reference image; and
   the vicinity of the outline is at least one of a region inside and a region outside the detection frame having a predetermined width, at a position where the image within the detection frame is discriminated to be an image of the specific subject.

2. An image processing apparatus as defined in claim 1, wherein:
   the plurality of images includes at least three images; and
   the coordinate converting unit converts the coordinates of the positions of each pixel within those images other than the reference image such that the positions of the corresponding points obtained by the corresponding point obtaining unit match the positions of the feature points.

3. An image processing method to be executed by an image processing apparatus comprising:
   setting a reference image to become a reference from among a plurality of images;
   detecting a specific subject from within the set reference image;
   extracting a plurality of feature points from within the reference image such that the average density of number of the feature points become higher in the vicinity of the outline of the detected specific subject than the average density of number of feature points at other regions;
   obtaining corresponding points within the plurality of images other than the reference image that correspond to the extracted feature points; and
   converting the coordinates of the positions of each pixel within at least one of the reference image and the other images such that the positions of the feature points and the positions of the corresponding points that correspond to the feature points match, and
   wherein the specific subject is a face,
   the detecting step further comprises discriminating whether an image representing the specific subject is within a detection frame and detecting by scanning the detection frame within the reference image, and
   the vicinity of the outline is at least one of a region inside and a region outside the detection frame having a predetermined width, at a position where the image within the detection frame is discriminated to be an image of the specific subject.

4. A non-transitory computer readable recording medium having recorded therein an image processing program that causes a computer to execute the procedures of:
   setting a reference image to become a reference from among a plurality of images;
   detecting a specific subject from within the set reference image;
   extracting a plurality of feature points from within the reference image such that the average density of number of the feature points become higher in the vicinity of the outline of the detected specific subject than the average density of number of feature points at other regions;
   obtaining corresponding points within the plurality of images other than the reference image that correspond to the extracted feature points; and
   converting the coordinates of the positions of each pixel within at least one of the reference image and the other images such that the positions of the feature points and the positions of the corresponding points that correspond to the feature points match, and
   wherein the specific subject is a face,
   the detecting step further comprises discriminating whether an image representing the specific subject is within a detection frame, and detecting by scanning the detection frame within the reference image; and
   the vicinity of the outline is at least one of a region inside and a region outside the detection frame having a predetermined width, at a position where the image within the detection frame is discriminated to be an image of the specific subject.

5. An image processing apparatus as defined in claim 1, wherein the average density of the number of feature points extracted from within the other regions is set in advance and the average density of the number of feature points extracted from within the vicinity of the outline of the specific subject is calculated based on the average density of the number of feature points extracted from within the other regions.

6. An image processing apparatus as defined in claim 5, wherein the average density of the number of feature points extracted from within the vicinity of the outline of the specific subject to be 1.5 or more times the average density of the number of feature points extracted from within the other regions.

* * * * *